United States Patent
Alfassi et al.

(10) Patent No.: US 12,530,764 B2
(45) Date of Patent: Jan. 20, 2026

(54) MATCHING BASED DEFECT EXAMINATION FOR SEMICONDUCTOR SPECIMENS

(71) Applicant: Applied Materials Israel Ltd., Rehovot (IL)

(72) Inventors: Yuval Alfassi, Rehovot (IL); Boris Sherman, Rehovot (IL); Marcelo Bacher, Givatayim (IL); Ortal Yesodi, Modiin-Maccabim-Reut (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 18/979,560

(22) Filed: Dec. 12, 2024

(65) Prior Publication Data

US 2025/0191177 A1 Jun. 12, 2025

(30) Foreign Application Priority Data

Dec. 12, 2023 (IL) .......................... 309325

(51) Int. Cl.
*G06T 7/00* (2017.01)
*H01L 21/66* (2006.01)

(52) U.S. Cl.
CPC .............. *G06T 7/001* (2013.01); *H01L 22/12* (2013.01); *G06T 2207/30148* (2013.01)

(58) Field of Classification Search
CPC .......... G06T 7/001; G06T 2207/30148; G06T 7/0004; H01L 22/12; H01L 22/00; G06V 10/764

See application file for complete search history.

(56) References Cited

U.S. PATENT DOCUMENTS

| | | | | |
|---|---|---|---|---|
| 2013/0336573 A1* | 12/2013 | Dalla-Torre | ............ | G06T 7/001 382/145 |
| 2014/0219544 A1* | 8/2014 | Wu | ........................ | H01L 22/34 382/149 |
| 2019/0287230 A1 | 9/2019 | Lu et al. | | |
| 2022/0343479 A1 | 10/2022 | Chang | | |

FOREIGN PATENT DOCUMENTS

| | | | | |
|---|---|---|---|---|
| CN | 106651857 A | * | 5/2017 | ............. G06T 5/002 |
| JP | 2014002144 A | * | 1/2014 | ............. G06T 7/001 |

* cited by examiner

*Primary Examiner* — Stephen R Koziol
(74) *Attorney, Agent, or Firm* — Lowenstein Sandler LLP

(57) ABSTRACT

There is provided a system and method of defect detection on a semiconductor specimen based on template matching or machine learning (ML). Template matching is performed between a set of template patches and a set of runtime images, by selectively performing at least two of the following: matching a defect template patch in an inspection image, matching a reference template patch in a reference image, or matching a difference template patch in a difference image, so as to provide likelihood of target of interest (TOI) presence in the inspection image. The ML-based approach includes feeding an inspection patch and a reference patch together to a trained ML model, to generate a feature vector representative of a given TOI candidate, and evaluating the feature vector of the given TOI candidate to provide a likelihood of the given TOI candidate being a TOI or non-TOI.

20 Claims, 5 Drawing Sheets

MATCHING BASED DEFECT EXAMINATION FOR SEMICONDUCTOR SPECIMENS

RELATED APPLICATIONS

This application claims the benefit of priority from Israeli Application No. 309325, filed Dec. 12, 2023, which is incorporated herein by reference.

TECHNICAL FIELD

The presently disclosed subject matter relates, in general, to the field of examination of a semiconductor specimen, and more specifically, to defect detection and classification on a specimen.

BACKGROUND

Current demands for high density and performance associated with ultra large-scale integration of fabricated devices require submicron features, increased transistor and circuit speeds, and improved reliability. As semiconductor processes progress, pattern dimensions such as line width, and other types of critical dimensions, are continuously shrunken. Such demands require formation of device features with high precision and uniformity, which, in turn, necessitates careful monitoring of the fabrication process, including automated examination of the devices while they are still in the form of semiconductor wafers.

Run-time examination can generally employ a two-phase procedure, e.g., inspection of a specimen followed by review of sampled locations of potential defects. Examination generally involves generating certain output (e.g., images, signals, etc.) for a specimen by directing light or electrons to the wafer, and detecting the light or electrons from the wafer. During the first phase, the surface of a specimen is inspected at high-speed and relatively low-resolution. Defect detection is typically performed by applying a defect detection algorithm to the inspection output. A defect map is produced to show suspected locations on the specimen having a high probability of being a defect. During the second phase, at least some of the suspected locations are more thoroughly analyzed with relatively high resolution, for determining different parameters of the defects, such as classes, thickness, roughness, size, and so on.

Examination can be provided by using non-destructive examination tools during or after manufacture of the specimen to be examined. A variety of non-destructive examination tools includes, by way of non-limiting example, scanning electron microscopes, atomic force microscopes, optical inspection tools, etc.

Examination processes can include a plurality of examination steps. The manufacturing process of a semiconductor device can include various procedures such as etching, depositing, planarization, growth such as epitaxial growth, implantation, etc. The examination steps can be performed a multiplicity of times, for example after certain process procedures, and/or after the manufacturing of certain layers, or the like. Additionally, or alternatively, each examination step can be repeated multiple times, for example for different wafer locations, or for the same wafer locations with different examination settings.

Examination processes are used at various steps during semiconductor fabrication to detect and classify defects on specimens, as well as perform metrology related operations. Effectiveness of examination can be improved by automatization of process(es) such as, for example, defect detection, Automatic Defect Classification (ADC), Automatic Defect Review (ADR), image segmentation, automated metrology-related operations, etc.

Automated examination systems ensure that the parts manufactured meet the quality standards expected and provide useful information on adjustments that may be needed to the manufacturing tools, equipment, and/or compositions, depending on the type of defects identified.

In some cases, machine learning technologies can be used to assist the automated examination process so as to promote higher yield. For instance, supervised machine learning can be used to enable accurate and efficient solutions for automating specific examination applications based on sufficiently annotated training images.

SUMMARY

In accordance with certain aspects of the presently disclosed subject matter, there is provided a computerized system of defect detection on a semiconductor specimen, the system comprising a processing circuitry configured to: obtain a set of template patches comprising: a target template patch capturing a target of interest (TOI), a reference template patch corresponding to the target template patch, and a difference template patch representative of a difference therebetween; acquire, in runtime, a set of runtime images of a semiconductor specimen to be examined, comprising an inspection image, a reference image corresponding to the inspection image, and a difference image representative of a difference therebetween; perform template matching between the set of template patches and the set of runtime images, comprising selectively performing at least two of: matching the defect template patch in the inspection image, matching the reference template patch in the reference image, or matching the difference template patch in the difference image; and provide likelihood of TOI presence in the inspection image based on a result of the template matching.

In addition to the above features, the system according to this aspect of the presently disclosed subject matter can comprise one or more of features (i) to (xiii) listed below, in any desired combination or permutation which is technically possible:

(i). The TOI can be a defect of interest (DOI), or a nuisance of interest (NOI).

(ii). The template matching can be performed based on a similarity measure between corresponding template patches and runtime images, giving rise to at least two matching score maps, and wherein the likelihood is provided by combining the at least two matching score maps to a composite score map, and identifying one or more relatively high scores in the composite score map corresponding to one or more locations in the inspection image representative of the TOI presence.

(iii). The template matching can be performed by matching the defect template patch in the inspection image, and matching the reference template patch in the reference image.

(iv). The template matching can be performed by matching the defect template patch in the inspection image, and matching the difference template patch in the difference image.

(v). The template matching can be performed by matching the reference template patch in the reference image, and matching the difference template patch in the difference image.

(vi). The template matching can be performed by matching the defect template patch in the inspection image, matching the reference template patch in the reference image, and matching the difference template patch in the difference image.

(vii). The inspection image can comprise one or more TOI candidates resulting from an inspection process of the semiconductor specimen, and the likelihood is provided with respect to verifying TOI presence among the one or more TOI candidates.

(viii). The processing circuitry can be configured to obtain a first set of template patches where the target template patch captures a DOI and a second set of template patches where the target template patch captures a NOI, perform template matching between the first set of template patches and the set of runtime images to provide likelihood of DOI presence among the one or more TOI candidates, and perform template matching between the second set of template patches and the set of runtime images to provide likelihood of NOI presence among the one or more TOI candidates.

(ix). The processing circuitry can be further configured to augment the set of template patches based on image transformation, giving rise to at least one augmented set of template patches, and include the at least one augmented set in the set of template patches.

(x). The set of template patches captures context information surrounding the TOI.

(xi) The set of template patches can be prepared during a setup phase based on previously captured images or synthetic images, or during runtime based on runtime images that were associated with TOI presence.

(xii). The set of template patches can be obtained based on images with relatively higher signal-to-noise ratio (SNR) captured in a sensitive scan, whereas the set of runtime images can be acquired in a throughput scan with relatively low SNR.

(xiii). The processing circuitry can be further configured to include the likelihood of TOI presence of a given TOI in the inspection image as an attribute in an attribute set characterizing the given TOI, and using the attribute set for one or more defect examination applications.

In accordance with other aspects of the presently disclosed subject matter, there is provided a computerized method of defect detection on a semiconductor specimen, the method comprising: obtaining a set of template patches comprising: a target template patch capturing a target of interest (TOI), a reference template patch corresponding to the target template patch, and a difference template patch representative of a difference therebetween; acquiring, in runtime, a set of runtime images of a semiconductor specimen to be examined, comprising an inspection image, a reference image corresponding to the inspection image, and a difference image representative of a difference therebetween; performing template matching between the set of template patches and the set of runtime images, comprising selectively performing at least two of: matching the defect template patch in the inspection image, matching the reference template patch in the reference image, or matching the difference template patch in the difference image; and providing likelihood of TOI presence in the inspection image based on a result of the template matching.

These aspects of the disclosed subject matter can comprise one or more of features (i) to (xiii) listed above with respect to the system, mutatis mutandis, in any desired combination or permutation which is technically possible.

In accordance with other aspects of the presently disclosed subject matter, there is provided a computerized system of defect detection on a semiconductor specimen, the system comprising a processing circuitry configured to acquire, in runtime, a set of runtime images of a specimen to be examined, comprising an inspection image comprising one or more TOI candidates, and a reference image corresponding to the inspection image; for each given TOI candidate, extract an image patch comprising the TOI candidate and a surrounding area from the inspection image, and a reference patch at a corresponding location from the reference image; feed the inspection patch and the reference patch together to a trained machine learning (ML) model, to generate a feature vector representative of the given TOI candidate, wherein the ML model is previously trained to map targets of interest (TOIs) and non-TOIs to corresponding feature vectors in an attribute space such that feature vectors of the TOIs are relatively close to each other with respect to feature vectors of the non-TOIs; and evaluate the feature vector of the given TOI candidate to provide a likelihood of the given TOI candidate being a TOI or non-TOI.

In addition to the above features, these aspects of the presently disclosed subject matter can comprise one or more of features (xiv) to (xxi) listed below, in any desired combination or permutation which is technically possible:

(xiv). The TOI can be a defect of interest (DOI), or a nuisance of interest (NOI).

(xv). The trained ML model can generate the feature vector by processing both the inspection patch and the reference patch so as to cause the feature vector to be more representative of the given TOI candidate itself while being less impacted by irrelevant features.

(xvi). The set of runtime images can further comprise a difference image representative of a difference between the inspection image and the reference image. The processing circuitry is further configured to, for each given TOI candidate, extract a difference patch at a corresponding location from the difference image in addition to the inspection patch and the reference patch, and feed the inspection patch, the reference patch, and the difference patch together to the trained ML model to generate the feature vector representative of the given TOI candidate.

(xvii). The ML model can be previously trained using a training set including a first subset of training samples, each comprising a TOI template patch and a corresponding reference template patches thereof, and a second subset of training samples, each comprising a non-TOI template patch and a corresponding reference template patches thereof.

(xviii). The ML model can be trained using a loss function configured to maximize a similarity between feature vectors derived from the first subset while minimizing a similarity between a feature vector derived from the first subset and a feature vector derived from the second subset.

(xix). The processing circuitry can be configured to evaluate the feature vector of the given TOI candidate by comparing it with a set of feature vectors representative of TOIs and a set of feature vectors representative of non-TOIs, and providing a likelihood of the given TOI candidate being a TOI or non-TOI based on a similarity therebetween. The set of feature vectors representative of TOIs and the set of feature vectors representative of non-TOIs are previously generated using the trained ML model and stored in a database.

(xx). The processing circuitry can be configured to evaluate the feature vector of the given candidate using a classification model operatively connected to the ML model. The classification model is configured to classify the given TOI candidate based on the feature vector thereof to provide a probability score indicating the likelihood of the given TOI candidate being a TOI or a non-TOI.

(xxi). The classification model can be trained together with the ML model using a second loss function configured to minimize a difference between a predicted class by the ML model and ground truth class of the given TOI candidate.

In accordance with other aspects of the presently disclosed subject matter, there is provided a computerized method of defect detection on a semiconductor specimen, the method comprising: acquiring, in runtime, a set of runtime images of a specimen to be examined, comprising an inspection image comprising one or more TOI candidates, and a reference image corresponding to the inspection image; for each given TOI candidate, extracting an image patch comprising the TOI candidate and a surrounding area from the inspection image, and a reference patch at a corresponding location from the reference image; feeding the inspection patch and the reference patch together to a trained machine learning (ML) model, to generate a feature vector representative of the given TOI candidate, wherein the ML model is previously trained to map targets of interest (TOIs) and non-TOIs to corresponding feature vectors in an attribute space such that feature vectors of the TOIs are relatively close to each other with respect to feature vectors of the non-TOIs; and evaluating the feature vector of the given TOI candidate to provide a likelihood of the given TOI candidate being a TOI or non-TOI.

These aspects of the disclosed subject matter can comprise one or more of features (xiv) to (xxi) listed above with respect to the system, mutatis mutandis, in any desired combination or permutation which is technically possible.

In accordance with other aspects of the presently disclosed subject matter, there is provided a non-transitory computer readable medium comprising instructions that, when executed by a computer, cause the computer to perform method steps of any of the above methods.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
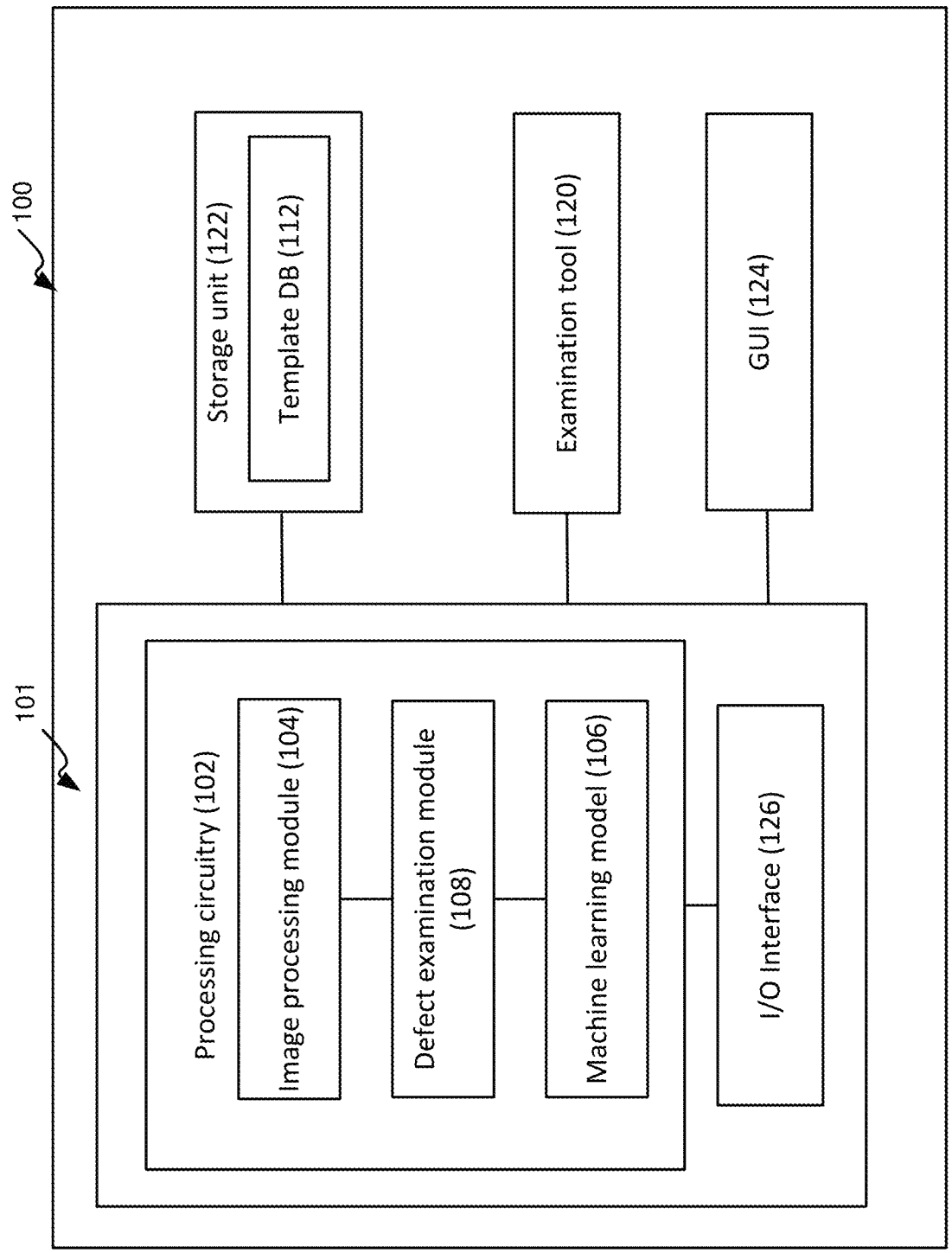
FIG. 1 illustrates a generalized block diagram of an examination system in accordance with certain embodiments of the presently disclosed subject matter.

The process of semiconductor manufacturing often requires multiple sequential processing steps and/or layers, some of which could possibly cause errors that may lead to yield loss. Examples of various processing steps can include lithography, etching, depositing, planarization, growth (such as, e.g., epitaxial growth), and implantation, etc. Various examination operations, such as defect-related examination (e.g., defect detection, defect review, and defect classification, etc.), and/or metrology-related examination (e.g., critical dimension (CD) measurements, etc.), can be performed at different processing steps/layers during the manufacturing process to monitor and control the process. The examination operations can be performed a multiplicity of times, for example after certain processing steps, and/or after the manufacturing of certain layers, or the like.

As described above, defect examination can generally employ a two-phase procedure, e.g., inspection of a specimen followed by review of sampled locations of potential defects. During the first phase, the surface of a specimen is inspected at high-speed and relatively low-resolution. Defect detection is typically performed by applying a defect detection algorithm to the inspection images. Various detection algorithms can be used for detecting defects on specimens, such as Die-to-Die (D2D), Die-to-History (D2H), Die-to-Database (D2DB), Cell-to-Cell (C2C), etc.

By way of example, a classic die-to-reference detection algorithm, such as, e.g., Die-to-Die (D2D), is typically used in some cases. In D2D, an inspection image of a target die is captured. For purpose of detecting defects in the inspection image, one or more reference images are captured from one or more reference dies (e.g., one or more neighboring dies) of the target die. The inspection image and the reference images are aligned and compared to each other. One or more difference images (and/or derivatives thereof, such as grade images) can be generated based on the difference between pixel values of the inspection image, and pixel values derived from the one or more reference images. A detection threshold is then applied to the difference maps, and a defect map indicative of defect candidates in the target die is created.

In some cases, a known target defect (i.e., a defect of interest (DOI)) can be provided, e.g., by the customer or the user, and it is desired to find similar defects with respect to the target defect, either directly on the inspection image, or among the defect candidates on the defect map resulting from defect detection. In some cases, hand-crafted attributes and/or machine-learning based features of the target defect can be calculated and used for purpose of searching for the similar defects. However, it is often difficult and time-consuming to derive relevant attributes/features that sufficiently represent the target defect. In addition, different variations on the inspection images, such as process variation, color variation, etc., may be caused by physical effects of the fabrication process and/or examination process of the specimen, which may further affect the quality of the calculated attributes. As a result, the classification results based on the extracted attributes often comprise a large number of false alarms including nuisances as well as other types of defects, in addition to the desired type of target defects, which affects defect detection sensitivity, thus degrading detection performance.

As semiconductor fabrication processes continue to advance, semiconductor devices are developed with increasingly complex structures with shrinking feature dimensions, which makes it even more challenging for the above conventional detection methodologies to provide satisfying examination performance.

Accordingly, certain embodiments of the presently disclosed subject matter propose to use a matching based defect examination system, which does not have one or more of the disadvantages described above. The present disclosure proposes to detect targets of interest (TOIs), in particular, defects of interest (DOIs) on semiconductor specimens, based on template matching or machine learning. The proposed runtime detection system can be configured to either perform selective template matching between a set of template patches pre-prepared and a set of runtime images, or use a pre-trained ML model to process at least an inspection patch and a reference patch of a given TOI candidate. The detection system can thus provide the likelihood of TOI presence based on the matching result or the feature vector generated by the ML model. The proposed system is capable of suppressing false alarms and improving defect detection sensitivity, as will be detailed below.

Bearing this in mind, attention is drawn to FIG. 1 illustrating a functional block diagram of an examination system in accordance with certain embodiments of the presently disclosed subject matter.

The examination system 100 illustrated in FIG. 1 can be used for examination of a semiconductor specimen (e.g., a wafer, a die, or parts thereof) as part of the specimen fabrication process. As described above, the examination referred to herein can be construed to cover any kind of operations related to defect inspection/detection, defect review, defect classification, nuisance filtration, segmentation, and/or metrology operations, etc., with respect to the specimen. System 100 comprises one or more examination tools 120 configured to scan a specimen and capture images thereof to be further processed for various examination applications.

The term "examination tool(s)" used herein should be expansively construed to cover any tools that can be used in examination-related processes, including, by way of non-limiting example, scanning (in a single or in multiple scans), imaging, sampling, reviewing, measuring, classifying, and/or other processes provided with regard to the specimen or parts thereof. Without limiting the scope of the disclosure in any way, it should also be noted that the examination tools 120 can be implemented as inspection machines of various types, such as optical inspection machines, electron beam inspection machines (e.g., a Scanning Electron Microscope (SEM), an Atomic Force Microscopy (AFM), or a Transmission Electron Microscope (TEM), etc.), and so on.

The one or more examination tools 120 can include one or more inspection tools and/or one or more review tools. In some cases, at least one of the examination tools 120 can be an inspection tool configured to scan a specimen (e.g., an entire wafer, an entire die, or portions thereof) to capture inspection images (typically, at a relatively high-speed and/or low-resolution) for detection of potential defects (i.e., defect candidates). During inspection, the wafer can move at a step size relative to the detector of the inspection tool (or the wafer and the tool can move in opposite directions relative to each other) during the exposure, and the wafer can be scanned step-by-step along swaths of the wafer by the inspection tool, where the inspection tool images a part/portion (within a swath) of the specimen at a time. By way of example, the inspection tool can be an optical inspection tool. At each step, light can be detected from a rectangular portion of the wafer and such detected light is converted into multiple intensity values at multiple points in the portion, thereby forming an image corresponding to the part/portion of the wafer. For instance, in optical inspection, an array of parallel laser beams can scan the surface of a wafer along the swaths. The swaths are laid down in parallel rows/columns contiguous to one another, to build up, swath-at-a-time, an image of the surface of the wafer. For instance, the tool can scan a wafer along a swath from up to down, then switch to the next swath and scan it from down to up, and so on and so forth, until the entire wafer is scanned and inspection images of the wafer are collected.

In some cases, at least one of the examination tools 120 can be a review tool, which is configured to capture review images of at least some of the defect candidates detected by inspection tools for ascertaining whether a defect candidate is indeed a defect of interest (DOI). Such a review tool is usually configured to inspect fragments of a specimen, one at a time (typically, at a relatively low-speed and/or high-resolution). By way of example, the review tool can be an electron beam tool, such as, e.g., scanning electron microscopy (SEM), etc. An SEM is a type of electron microscope that produces images of a specimen by scanning the specimen with a focused beam of electrons. The electrons interact with atoms in the specimen, producing various signals that contain information on the surface topography and/or composition of the specimen. An SEM is capable of accurately inspecting and measuring features during the manufacture of semiconductor wafers.

The inspection tool and review tool can be different tools located at the same or at different locations, or a single tool operated in two different modes. In some cases, the same examination tool can provide low-resolution image data and high-resolution image data. The resulting image data (low-resolution image data and/or high-resolution image data) can be transmitted—directly or via one or more intermediate systems—to system 101. The present disclosure is not limited to any specific type of examination tools and/or the resolution of image data resulting from the examination tools. In some cases, at least one of the examination tools 120 has metrology capabilities and can be configured to capture images and perform metrology operations on the captured images. Such an examination tool is also referred to as a metrology tool.

According to certain embodiments of the presently disclosed subject matter, the examination system 100 comprises a computer-based system 101 operatively connected to the examination tools 120 and capable of automatic TOI detection (e.g., defect detection) on a semiconductor specimen in runtime based on runtime images obtained during specimen fabrication. System 101 is also referred to as a TOI detection or defect detection system.

System 101 includes a processing circuitry 102 operatively connected to a hardware-based I/O interface 126 and configured to provide processing necessary for operating the system, as further detailed with reference to FIGS. 2-5. The processing circuitry 102 can comprise one or more processors (not shown separately) and one or more memories (not shown separately). The one or more processors of the processing circuitry 102 can be configured to, either separately or in any appropriate combination, execute several functional modules in accordance with computer-readable instructions implemented on a non-transitory computer-readable memory comprised in the processing circuitry. Such functional modules are referred to hereinafter as comprised in the processing circuitry.

The one or more processors referred to herein can represent one or more general-purpose processing devices such as a microprocessor, a central processing unit, or the like. More particularly, a given processor may be one of a complex instruction set computing (CISC) microprocessor, a reduced instruction set computing (RISC) microprocessor, a very long instruction word (VLIW) microprocessor, a processor implementing other instruction sets, or a processor implementing a combination of instruction sets. The one or more processors may also be one or more special-purpose processing devices such as an application specific integrated circuit (ASIC), a field programmable gate array (FPGA), a digital signal processor (DSP), a network processor, or the like. The one or more processors are configured to execute instructions for performing the operations and steps discussed herein.

The memories referred to herein can comprise one or more of the following: internal memory, such as, e.g., processor registers and cache, etc., main memory such as, e.g., read-only memory (ROM), flash memory, dynamic random access memory (DRAM) such as synchronous DRAM (SDRAM) or Rambus DRAM (RDRAM), etc.

According to certain embodiments of the presently disclosed subject matter, system 101 can be a runtime detection system configured to perform TOI detection operations based on template matching. In such cases, one or more functional modules comprised in the processing circuitry 102 of system 101 can include an image processing module 104, and a defect examination module 108 operatively connected to the image processing module 104.

Specifically, the processing circuitry 102, in particular the image processing module 104, can be configured to obtain, in setup or runtime, via an I/O interface 126, a set of template patches comprising a target template patch capturing a target of interest (TOI), a reference template patch corresponding to the target template patch, and a difference template patch representative of a difference therebetween. The image processing module 104 can further acquire, in runtime, a set of runtime images of a specimen to be examined from the examination tool 120. The set of runtime images comprises an inspection image, a reference image corresponding to the inspection image, and a difference image representative of a difference therebetween.

The image processing module 104 can be configured to perform template matching between the set of template patches and the set of runtime images, comprising selectively performing at least two of the following: matching the defect template patch in the inspection image, matching the reference template patch in the reference image, or matching the difference template patch in the difference image. The defect examination module 108 can be configured to provide likelihood of presence of TOI in the inspection image, based on a result of the template matching.

In some cases, optionally, the defect examination module 108 can be further configured to perform additional defect examination based on the estimated likelihood of TOI presence on the inspection image. Examples of further defect examination can include, e.g., further nuisance filtration, defect review, and defect classification, etc. In such cases, the image processing module 104 and defect examination module 108 can be regarded as part of a defect examination recipe usable for performing runtime defect examination operations on acquired runtime images.

According to some alternative embodiments of the presently disclosed subject matter, system 101 can be a runtime detection system configured to perform TOI detection operations based on machine learning. In such cases, one or more functional modules comprised in the processing circuitry 102 of system 101 can include an image processing module 104, a ML model 106 that was previously trained during a training/setup phase, and a defect examination module 108.

Specifically, the processing circuitry 102 can be configured to acquire in runtime, via an I/O interface 126, a set of runtime images of a specimen to be examined. The set of runtime images comprises an inspection image comprising one or more TOI candidates, and a reference image corresponding to the inspection image.

The image processing module 104 can be configured to, for each given TOI candidate, extract an image patch from the inspection image comprising the given TOI candidate and a surrounding area, and a reference patch at a corresponding location from the reference image. The image patch and the reference patch can be fed together into the trained ML model 106, to generate a feature vector representative of the given TOI candidate. The ML model has been previously trained to map targets of interest (TOIs) and non-TOIs to corresponding feature vectors in an attribute space such that feature vectors of TOIs are relatively close to each other with respect to feature vectors of non-TOIs. The feature vector of the given candidate can be evaluated to provide a likelihood of the given TOI candidate being a TOI or non-TOI.

Once all the TOI candidates are evaluated, in some cases, the defect examination module 108 can be configured to perform further defect examination based on the estimated likelihood of TOI presence among the one or more candidates, such as, e.g., further nuisance filtration, defect review, defect classification, etc. In such cases, the image processing module 104, the ML model 106, and defect examination module 108, can be regarded as part of a defect examination recipe usable for performing runtime defect examination operations on acquired runtime images.

In either of the above-described embodiments, system 101 can be regarded as a runtime detection system capable of performing runtime defect-related operations using the defect examination recipe.

With respect to the ML-based detection system, in some cases system 101 can be configured as a training system capable of training the ML model during a training/setup phase using a specific training set. In such cases, one or more functional modules comprised in the processing circuitry 102 of system 101 can include a training module (not illustrated in the figure) and a ML model 106 to be trained. Specifically, the training module can be configured to obtain a training set including a first subset of training samples, each comprising a TOI template patch and a corresponding reference template patch thereof, and a second subset of training samples each comprising a non-TOI template patch and a corresponding reference template patch thereof.

The training module can be configured to train the ML model 106 using the training set. As described above, the ML model, upon being trained, is usable for TOI detection in runtime. Details of the training process are described below with reference to FIGS. 5 and 7.

Operation of systems 100 and 101, the processing circuitry 102, and the functional modules therein, will be further detailed with reference to FIGS. 2-5.

According to certain embodiments, the ML model 106 can be implemented as various types of machine learning models. By way of example, the ML models can be implemented as one of the following: various neural networks, Bayesian network, transformers, and/or ensembles/combinations thereof. The learning algorithms used by the ML models can be any of the following: supervised learning, unsupervised learning, self-supervised, or semi-supervised learning, etc. The presently disclosed subject matter is not limited to the specific types of the ML model or the specific types of learning algorithms used by the ML model.

In some embodiments, the ML model can be implemented as a deep neural network (DNN). DNN can comprise multiple layers organized in accordance with respective DNN architecture. By way of non-limiting example, the layers of DNN can be organized in accordance with architecture of Convolutional Neural Network (CNN), Recurrent Neural Network, Recursive Neural Networks, autoencoder, Generative Adversarial Network (GAN), or otherwise. Optionally, at least some of the layers can be organized into a plurality of DNN sub-networks. Each layer of DNN can include multiple basic computational elements (CE) typically referred to in the art as dimensions, neurons, or nodes.

The weighting and/or threshold values associated with the CEs of a DNN and the connections thereof can be initially selected prior to training, and can be further iteratively adjusted or modified during training to achieve an optimal set of weighting and/or threshold values in a trained DNN. After each iteration, a difference can be determined between the actual output produced by DNN module and the target output associated with the respective training set of data. The difference can be referred to as an error value. Training can be determined to be complete when a loss/cost function indicative of the error value is less than a predetermined value, or when a limited change in performance between iterations is achieved. A set of input data used to adjust the weights/thresholds of a DNN is referred to as a training set.

It is noted that the teachings of the presently disclosed subject matter are not bound by specific architecture of the ML models as described above.

It is to be noted that while certain embodiments of the present disclosure refer to the processing circuitry 102 being configured to perform the above recited operations, the functionalities/operations of the aforementioned functional modules can be performed by the one or more processors in processing circuitry 102 in various ways. By way of example, the operations of each functional module can be performed by a specific processor, or by a combination of processors. The operations of the various functional modules, such as template matching, TOI presence estimation, and performing defect examination, etc., or ML model processing and TOI presence evaluation, etc., can thus be performed by respective processors (or processor combinations) in the processing circuitry 102, while, optionally, these operations may be performed by the same processor. The present disclosure should not be limited to being construed as one single processor always performing all the operations.

In some cases, additionally to system 101, the examination system 100 can comprise one or more examination modules, such as, e.g., defect detection module, nuisance filtration module, Automatic Defect Review Module (ADR), Automatic Defect Classification Module (ADC), metrology operation module, and/or other examination modules which are usable for examination of a semiconductor specimen. The one or more examination modules can be implemented as stand-alone computers, or their functionalities (or at least part thereof) can be integrated with the examination tool 120. In some cases, the output of system 101, e.g., the estimated TOI presence, and/or further defect examination result, can be provided to the one or more examination modules (such as the ADR, ADC, etc.) for further processing.

According to certain embodiments, system 100 can comprise a storage unit 122. The storage unit 122 can be configured to store any data necessary for operating system 101, e.g., data related to input and output of system 101, as well as intermediate processing results generated by system 101. By way of example, the storage unit 122 can be configured to store images of the specimen and/or derivatives thereof produced by the examination tool 120, such as, e.g., the runtime images, the training set, as described above. In the template matching based approaches, the storage unit 122 can include a template database (DB) 112 configured to store a set of template patches prepared during setup or runtime. In the ML based approaches, the storage unit 122 can include a feature vector database (DB) configured to store a set of feature vectors representative of TOIs and a set of feature vectors representative of non-TOIs prepared during setup or runtime. Accordingly, the different types of input data as required can be retrieved from the storage unit 122 and provided to the processing circuitry 102 for further processing. The output of the system 101, such as, e.g., the estimated TOI presence, and/or further defect examination result, can be sent to storage unit 122 to be stored.

In some embodiments, system 100 can optionally comprise a computer-based Graphical User Interface (GUI) 124 which is configured to enable user-specified inputs related to system 101. For instance, the user can be presented with a visual representation of the specimen (for example, by a display forming part of GUI 124), including the images of the specimen, etc. The user may be provided, through the GUI, with options of defining certain operation parameters, such as, e.g., weights applied on different template matching, image augmentation options, etc. The user may also view the operation results or intermediate processing results, such as, e.g., the estimated TOI presence, and/or further defect examination results, etc., on the GUI.

In some cases, system 101 can be further configured to send, via I/O interface 126, the operation results to the examination tool 120 for further processing. In some cases, system 101 can be further configured to send the results to the storage unit 122, and/or external systems (e.g., Yield Management System (YMS) of a fabrication plant (fab)). A yield management system (YMS) in the context of semiconductor manufacturing is a data management, analysis, and tool system that collects data from the fab, especially during manufacturing ramp ups, and helps engineers find ways to improve yield. YMS helps semiconductor manufacturers and fabs manage high volumes of production analysis with fewer engineers. These systems analyze the yield data and generate reports. YMS can be used by Integrated Device Manufacturers (IMD), fabs, fabless semiconductor companies, and Outsourced Semiconductor Assembly and Test (OSAT).

Those versed in the art will readily appreciate that the teachings of the presently disclosed subject matter are not bound by the system illustrated in FIG. 1. Each system component and module in FIG. 1 can be made up of any combination of software, hardware, and/or firmware, as relevant, executed on a suitable device or devices, which perform the functions as defined and explained herein. Equivalent and/or modified functionality, as described with respect to each system component and module, can be consolidated or divided in another manner. Thus, in some embodiments of the presently disclosed subject matter, the system may include fewer, more, modified and/or different components, modules, and functions than those shown in FIG. 1.

Each component in FIG. 1 may represent a plurality of the particular components, which are adapted to independently and/or cooperatively operate to process various data and electrical inputs, and for enabling operations related to a computerized examination system. In some cases, multiple instances of a component may be utilized for reasons of performance, redundancy, and/or availability. Similarly, in some cases, multiple instances of a component may be utilized for reasons of functionality or application. For example, different portions of the particular functionality may be placed in different instances of the component.

It should be noted that the examination system illustrated in FIG. 1 can be implemented in a distributed computing environment, in which one or more of the aforementioned components and functional modules shown in FIG. 1 can be distributed over several local and/or remote devices. By way of example, the examination tool 120 and the system 101 can be located at the same entity (in some cases hosted by the same device) or distributed over different entities. By way of another example, as described above, in some cases, system 101 can be configured as a training system for training the ML model, while in some other cases, system 101 can be configured as a runtime detection system using the trained ML model. The training system and the runtime detection system can be located at the same entity (in some cases hosted by the same device), or distributed over different entities, depending on specific system configurations and implementation needs.

In some examples, certain components utilize a cloud implementation, e.g., are implemented in a private or public cloud. Communication between the various components of the examination system, in cases where they are not located entirely in one location or in one physical entity, can be realized by any signaling system or communication components, modules, protocols, software languages, and drive signals, and can be wired and/or wireless, as appropriate.

It should be further noted that in some embodiments at least some of examination tools 120, storage unit 122 and/or GUI 124 can be external to the examination system 100 and operate in data communication with systems 100 and 101 via I/O interface 126. System 101 can be implemented as stand-alone computer(s) to be used in conjunction with the examination tools, and/or with the additional examination modules as described above. Alternatively, the respective functions of the system 101 can, at least partly, be integrated with one or more examination tools 120, thereby facilitating and enhancing the functionalities of the examination tools 120 in examination-related processes.

While not necessarily so, the process of operations of systems 101 and 100 can correspond to some or all of the stages of the methods described with respect to FIGS. 2-5. Likewise, the methods described with respect to FIGS. 2-5 and their possible implementations can be implemented by systems 101 and 100. It is therefore noted that embodiments discussed in relation to the methods described with respect to FIGS. 2-5 can also be implemented, mutatis mutandis as various embodiments of the systems 101 and 100, and vice versa.

Figure 2:
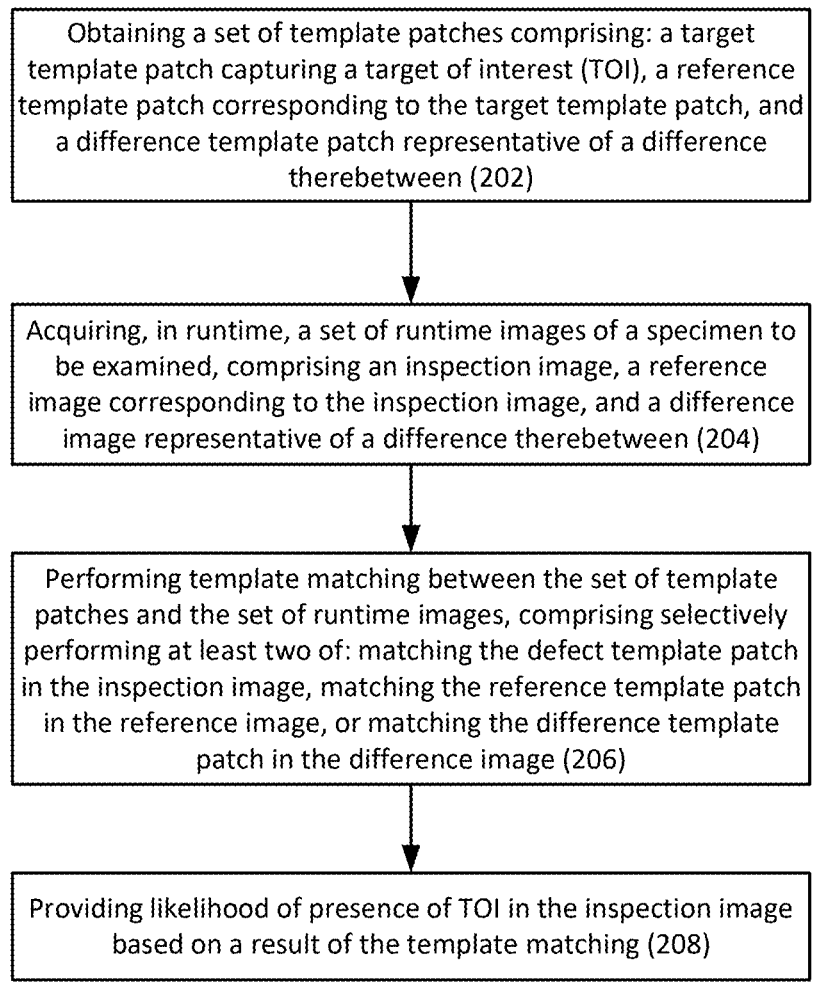
FIG. 2 illustrates a generalized flowchart of defect detection on a semiconductor specimen in accordance with certain embodiments of the presently disclosed subject matter.

Referring to FIG. 2, there is illustrated a generalized flowchart of TOI detection on a semiconductor specimen based on template matching in accordance with certain embodiments of the presently disclosed subject matter.

As described above, a semiconductor specimen is typically made of multiple layers. The examination process of a specimen can be performed a multiplicity of times during the fabrication process of the specimen, for example following the processing steps of specific layers. In some cases, a sampled set of processing steps can be selected for in-line examination, based on their known impacts on device characteristics or yield. Images of the specimen or parts thereof can be acquired at the sampled set of processing steps to be examined.

For the purpose of illustration only, certain embodiments of the following description are described with respect to images of a given processing step/layer of the sampled set of processing steps. Those skilled in the art will readily appreciate that the teachings of the presently disclosed subject matter, such as the process of defect detection and examination described below, can be performed following any layer and/or processing steps of the specimen. The present disclosure should not be limited to the number of layers comprised in the specimen and/or the specific layer(s) to be examined.

A set of template patches can be obtained (202) (e.g., by the image processing module 104 in processing circuitry 102). The set of template patches comprises a target template patch capturing a target of interest (TOI), a reference template patch corresponding to the target template patch, and a difference template patch representative of a difference therebetween.

A target of interest (TOI) can refer to a defect of interest (DOI), or a nuisance of interest (NOI). By way of example, the TOI can be a known type of DOI that is of interest to be detected. The TOI can be selected/provided by a party of interest, such as a customer, a user, etc. The target template patch can be obtained by cropping, from an inspection image, an image patch containing the TOI. The image patch can be of various sizes, such as, e.g., 32×32 pixels, 64×64 pixels, or any other suitable sizes/dimensions. In some embodiments, the template patch can be extracted to capture context information surrounding the TOI. The context information can include any contextual areas/structures that are in proximity to the TOI, such as, e.g., one or more neighboring or environmental structures. By way of example, a TOI of a contact may have a line structure as a neighboring structure next to it. When selecting the area for cropping the template patch (such as placing a bounding box around the TOI), the bounding box can include at least part of the line structure, in addition to the TOI of the contact, so as to provide context information for the TOI.

A reference template patch refers to an image patch cropped at a corresponding location of a reference image corresponding to the inspection image. A reference image corresponds to the inspection image in the sense that it captures a similar region containing similar patterns as those of the inspection image. As will be detailed below with reference to block 204, a reference image generally refers to a TOI-free image, i.e., a clean image without any TOI feature. The reference image and the inspection image can be normally registered (i.e., aligned one to the other), as are the reference template patch and the target template patch which are cropped at corresponding locations from the two images. In some cases, the reference image and the inspection image can be pre-processed in various aspects, such as, e.g., noise filtration, SNR enhancement, etc.

The difference template patch represents the difference between the target template patch and the reference patch. By way of example, the difference template patch can be cropped from a corresponding location of a difference image, or a derivative of the difference image resulting from comparison between pixel values of the inspection image and the reference image thereof. For instance, the difference image can be generated by subtracting the reference image from the inspection image. In some cases, a grade image, as a derivative of the difference image, can be generated by applying a predefined difference normalization factor on the difference image. For instance, the difference normalization factor can be determined based on behavior of a normal population of pixel values, and can be used to normalize the pixel values of the difference image. By way of example, the grade of a pixel can be calculated as a ratio between a corresponding pixel value of the difference image and the predefined difference normalization factor. The difference template patch can be obtained from the difference image, the grade image, or any further derivative thereof.

In cases where the target template patch is cropped to capture context information surrounding the TOI, the corresponding reference template patch and difference template patch should also be cropped in a similar manner to capture the same context information in the surrounding area. Using a set of template patches containing context information of the TOI such as environmental structures allows to find accurate matching of the intended TOI feature with specific context, rather than identifying any candidate feature irrespective of the surrounding context. In the previous example, where a TOI of a contact has an environmental context of a line structure, when the template patches are cropped to include at least part of the line structure, the template matching will result in only similar contacts having similar context, rather than presenting all contacts with similar sizes, irrespective of the context. This can be particularly beneficial in cases where the TOI appears as a non-repetitive pattern. In such cases, it is possible to select a contextual area around the TOI and include it in the template patch, so as to assist in finding the intended TOI.

In some cases, the set of template patches, or at least part thereof, can be synthetically generated, e.g., by image simulation, in comparison to obtaining from real images resulting from actual image acquisition by an examination tool. For instance, the reference patch can be a simulated TOI-free image synthetically generated. Such a synthetic image can be generated in various ways, such as, e.g., based on design data of the specimen, or using a ML model (or a classical algorithm) which learns about normal image behaviors from regular scans of the specimen, etc. The target template patch can be synthetically generated by implanting a TOI in a base image (e.g., a TOI-free image) that can be a real or synthetic image. In some cases, at least one of the target template patch and the reference patch can be a synthetic image. The present disclosure is not limited to the specific ways of acquiring/generating the set of template patches or part thereof.

In some embodiments, the set of template patches can be augmented based on image transformation, including (but not limited to) one or more of the following augmentation techniques: flipping, rotating, scaling, brightening, darkening, and adding noises, etc. Such image augmentation can synthetically create template patches representing different orientations and/or variations with respect to the original template patches, the variations caused due to certain physical effects in the manufacturing process and/or examination process, thus enabling identifying candidates possessing such differences.

At least one augmented set of template patches can be generated and included into the set of template patches. By way of example, the original set of template patches can be flipped horizontally (e.g., swap left and right) and/or vertically (e.g., swap top and bottom), giving rise to an augmented set of template patches. The original set and the augmented set can be used together during the template matching, such that candidates that are of similar geometric shape of the original TOI, but with different orientations, can also be identified during the matching.

In some cases, multiple augmentation techniques can be respectively applied to the original set of template patches, giving rise to multiple augmented sets. The multiple sets can be used together with the original set to enrich the template patches, so as to find candidates with different variations. It is to be noted that in cases of applying image augmentation, the three original template patches in the set should normally be augmented together in a similar manner (e.g., using the same augmentation technique) so as to preserve consistency and alignment between each other.

In some cases, the set of template patches can be prepared during a setup phase based on previously captured specimen images or synthetic images. In some cases, the set of template patches can be prepared during runtime, e.g., at the beginning of runtime examination, based on part of the runtime images that are firstly acquired during runtime examination and are ascertained to be associated with TOI presence.

Upon preparing the set of template patches, a set of runtime images of a specimen to be examined can be acquired (204) in runtime (e.g., by the image processing module 104 in processing circuitry 102). The set of runtime images can comprise an inspection image of a semiconductor specimen to be examined, a reference image corresponding to the inspection image, and a difference image representative of a difference therebetween.

A semiconductor specimen here can refer to a semiconductor wafer, a die, or parts thereof, that is fabricated and examined in the fab during a fabrication process thereof. An inspection image of a specimen can refer to an image capturing at least part of the specimen to be examined by an inspection tool. By way of example, an inspection image can capture a target region or a target structure (e.g., a structural feature or pattern on a semiconductor specimen) that is of interest to be examined on a semiconductor specimen.

For each inspection image, one or more reference images can be used for defect detection. A reference image refers to a nominal/TOI-free image that is free of the TOI features, or has a high probability of not comprising any TOI features, such that it can be used as a reference for a corresponding inspection image for purpose of defect examination. The reference image and the inspection image are normally registered (i.e., aligned to one another). The one or more reference images can be obtained in various ways. In some cases, one or more reference images can be captured from one or more reference dies (e.g., neighboring dies of the inspection die) of the same specimen or a different specimen. In some cases, a reference image can be synthetically generated by image simulation. By way of example, a simulated image can be generated based on design data (e.g., CAD data) of a die or part thereof. The number of reference images used herein and the way of obtaining such images should not be construed to limit the present disclosure in any way. In some cases, the set of runtime images can comprise one or more reference images, or a composite reference image generated by combining one or more reference images.

The inspection image and/or its reference image can be acquired in runtime using various types of inspection tools. For instance, the images can be electron beam (e-beam) images acquired by an electron beam tool, or optical images acquired by an optical inspection tool in runtime during in-line examination of the semiconductor specimen. The reference image and the inspection image can be pre-processed in some cases.

The difference image represents the difference between the inspection image and the reference image. The difference image can refer to a difference image generated by directly subtracting the reference image from the inspection image, or a grade image as a derivative of the difference image (or any further derivative thereof), as described above in detail with reference to block 202.

Template matching can be performed (206) (e.g., by the image processing module 104 in processing circuitry 102) between the set of template patches and the set of runtime images. The template matching between the two sets of images can be selectively performed. By way of example, at least two of the following matching options can be selectively performed: matching the defect template patch in the inspection image, matching the reference template patch in the reference image, or matching the difference template patch in the difference image.

For instance, in some cases, the following two matching options can be selected to be performed: matching the defect template patch in the inspection image, and matching the reference template patch in the reference image. In some cases, matching the defect template patch in the inspection image, and matching the difference template patch in the difference image can be selected to be performed. In some other cases, all three matching options between corresponding image pairs in the two sets can be performed, including matching the defect template patch in the inspection image, matching the reference template patch in the reference image, and matching the difference template patch in the difference image.

In some embodiments, template matching can be performed based on a similarity measure between corresponding template patches and runtime images. Any suitable similarity-based matching techniques can be used, such as e.g., normalized cross correlation, or normalized squared difference, etc.

Taking the matching of the target template patch in the inspection image for example, the matching can be performed by moving the target template patch in the inspection image at a step size (e.g., the target template patch can move as a sliding box in the area of the inspection image), and performing template matching at each step (e.g., correlation between the template patch and the image portion in the inspection image that is presently covered by the template patch). In one example, the matching can be performed using zero normalized cross-correlation.

Once the template patch traverses the entire image area of the inspection image, a matching score map can be generated based on the template-matching result of each step. The score map represents the similarity between the template patch with respect to each image portion along the traverse of the image area. By way of example, the matching score map can comprise probability scores where each score corresponds to a specific pixel in the inspection image and represents a probability of the specific pixel being part of a TOI. The matching between the reference template patch and the reference image, as well as the matching between the different template patch and the difference image, can be performed in a similar manner.

The likelihood of TOI presence in the inspection image can be provided (208) (e.g., by the defect examination module 108) based on the result of the template matching. By way of example, in cases where at least two matchings are performed, the respective template matching results in at least two matching score maps. The likelihood of TOI presence in the inspection image can be estimated/provided by combining the at least two matching score maps (e.g., by any suitable combining/averaging techniques, such as summation, weighted average, multiplication, etc.) to a composite score map, and identifying one or more relatively high scores (e.g., relatively higher than a threshold) in the composite score map corresponding to one or more locations in the inspection image representative of TOI presence.

In some embodiments, the inspection image can comprise one or more TOI candidates resulting from an earlier inspection process of the semiconductor specimen. The inspection process of the specimen can be performed beforehand (e.g., for purpose of defect detection or nuisance filtration), and one or more TOI candidates can be identified based on a detection map (such as, e.g., a defect map or a nuisance map) resulting from the inspection process. In such cases, the likelihood of the TOI presence in the inspection image can be provided by verifying the presence of TOI among the one or more candidates. For instance, the template matching can be performed specifically within one or more image areas containing the one or more TOI candidates, rather than on the entire image, which greatly improves the computation efficiency.

In some cases, the likelihood of TOI presence of a given TOI (e.g., a probability score of the TOI as provided by the composite score map) can be used as an attribute characterizing the given TOI. Such an attribute can be included, together with other attributes of the TOI, in an attribute set characterizing the given TOI. The attribute set can be used for one or more defect examination applications, such as, e.g., defect classification, filtration, etc.

As described above, the above methodology of TOI detection can be used for detecting defects of interest (DOIs), and/or detecting nuisances of interest (NOIs). In some embodiments, the TOI can be a specific type of DOI to be detected, and the process described with reference to FIG. 2 can be used to search for similar DOIs in the inspection image and/or among the one or more DOI candidates resulting from previous inspection.

In some other embodiments, the TOI can be a specific type of nuisance to be detected and filtered, and the process described with reference to FIG. 2 can be used to search for a similar type of nuisances in the inspection image and/or the one or more NOI candidates resulting from previous inspection. In some further embodiments, the proposed process can be used for detection of both DOIs and NOIs, as described with reference to FIG. 3.

Figure 3:
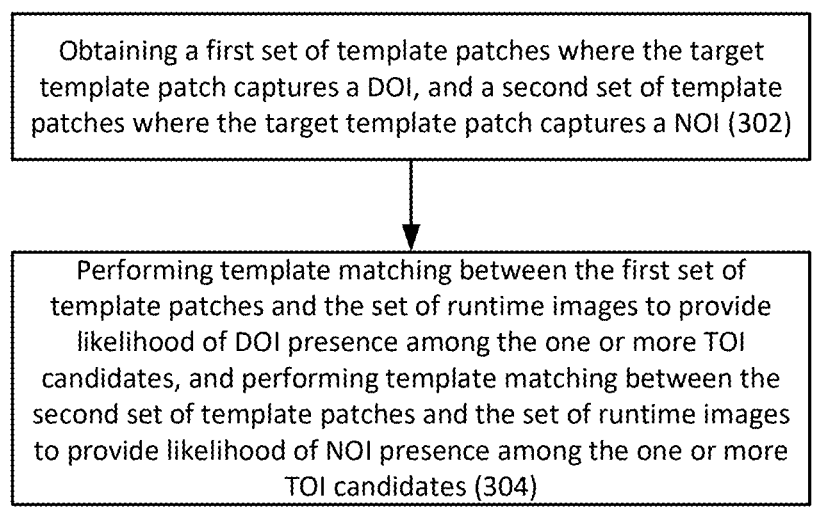
FIG. 3 illustrates a generalized flowchart of detecting DOIs and NOIs among one or more candidates on a semiconductor specimen in accordance with certain embodiments of the presently disclosed subject matter.

Turning now to FIG. 3, there is illustrated a generalized flowchart of detecting DOIs and NOIs among one or more candidates on a semiconductor specimen in accordance with certain embodiments of the presently disclosed subject matter.

A first set of template patches where the target template patch captures a DOI, and a second set of template patches where the target template patch captures a NOI, can be obtained (302) (e.g., by the image processing module 104).

The two sets of template patches can be prepared in a similar manner as described above with reference to block 202 in FIG. 2.

As described above, the inspection image in some cases can comprise one or more TOI candidates, such as DOI candidates, resulting from an inspection process of the semiconductor specimen. Template matching can be performed (304) (e.g., by the image processing module 104) between the first set of template patches and the set of runtime images, to provide likelihood of DOI presence among the one or more TOI candidates. This can enable to further select, from the one or more candidates, the ones that have higher probability of being DOIs. In addition, template matching can also be performed between the second set of template patches and the set of runtime images to provide likelihood of NOI presence among the one or more TOI candidates. The candidates that are more likely to be NOIs can be filtered out from the TOI candidates, thus reducing nuisances and false alarms from these candidates.

By performing both the matching of DOIs and the matching of NOIs, the TOI candidates (which are normally in a large population) are further processed in both aspects such that the ones which have higher probabilities of being DOIs are selected to be further examined (e.g., reviewed and/or classified), and the ones that are likely to be NOIs are filtered out.

In some cases, in addition to the first set and second set as described above, it is possible to obtain one or more additional sets of template patches, such as, e.g., a third set of DOIs of other types, and a fourth set of NOIs of other types, etc. In such cases, template matching can be repetitively performed between each respective set of template patches and the set of runtime images, so as to provide the likelihood of any of the TOI candidates being the respective types of DOIs and/or NOIs as defined in the respective sets of template patches. The TOI candidates can be further refined based on the results of such template matchings.

In some embodiments, the set of template patches obtained in block 202 can be prepared based on images with higher signal-to-noise ratio (SNR) captured during a sensitive scan of a specimen. A sensitive scan refers to scanning a specimen with a relatively lower speed and higher resolution, resulting in inspection images having relatively high SNR. By way of example, when scanning a specimen using an e-beam inspection tool, a sensitive scan can result in more frames captured for a given inspection area, which, when being combined, can form the inspection image, where random noises are significantly reduced and SNR of the image is increased.

During runtime examination, for purpose of meeting throughput (TpT) requirement, the set of runtime images are usually acquired in a throughput scan with relatively low SNR. A throughput scan refers to scanning a specimen with a relatively higher speed and lower resolution, resulting in inspection images having relatively low SNR. Using the set of template patches obtained in a sensitive scan for template matching in the set of runtime images captured during a throughput scan has proven to improve the matching accuracy and capture rate, relative to using template patches acquired in a throughput scan with lower resolution. Since the set of template patches of a sensitive scan are obtained only during setup, using such a set does not negatively affect the TpT of the system.

Figure 6:
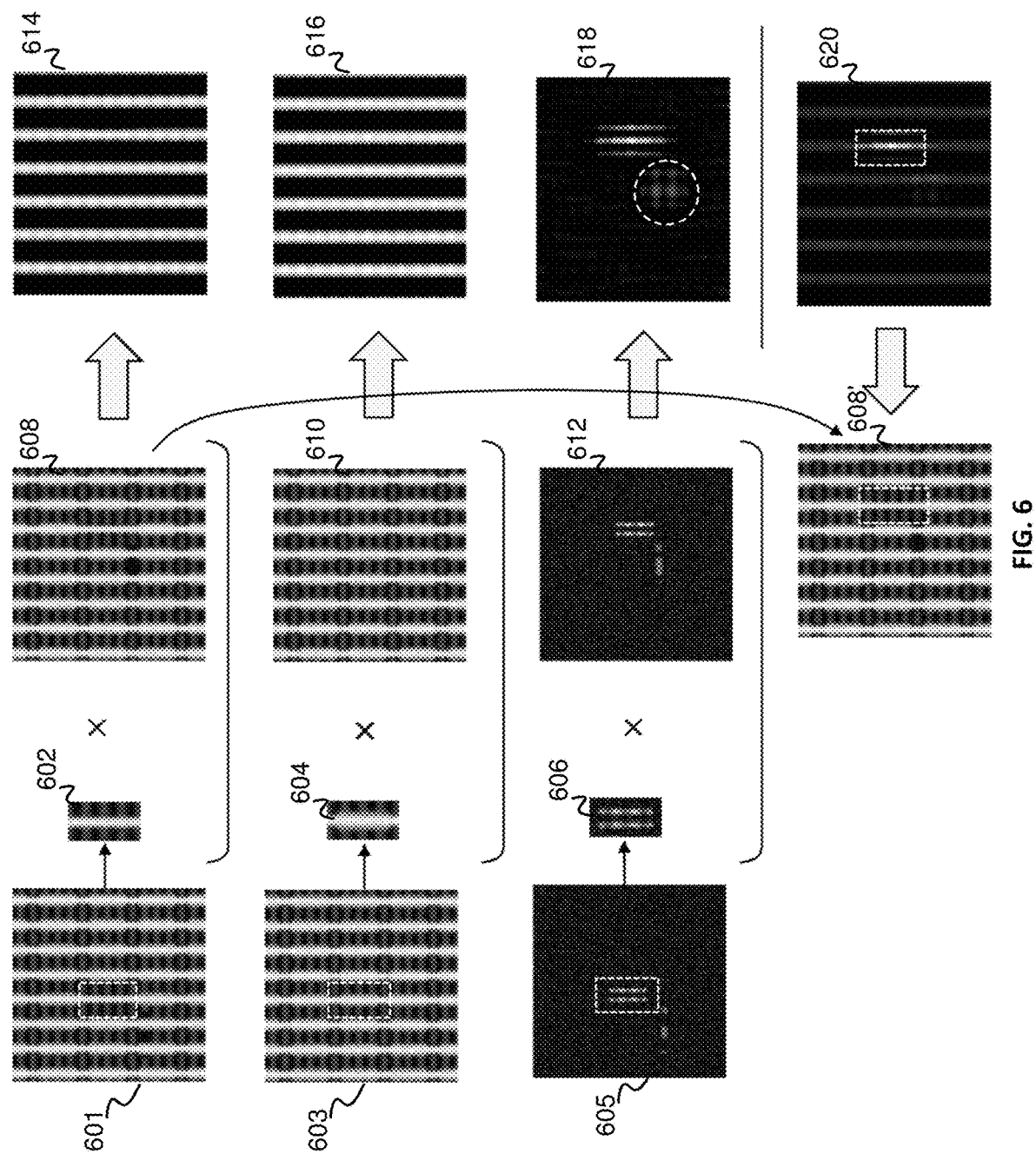
FIG. 6 shows a schematic illustration of an example of template-matching based defect detection in accordance with certain embodiments of the presently disclosed subject matter.

Turning now to FIG. 6, this is a schematic illustration of an example of template-matching based defect detection in accordance with certain embodiments of the presently disclosed subject matter.

A set of template patches can be prepared during setup from a set of template images which are previously acquired/generated and used for the purpose of template patch extraction. The set of template images includes a template inspection image 601 comprising a target of interest (TOI), which, in the present example is a defect of interest (DOI) (exemplified as a defective line structure marked in dashed square in the figure, representative of certain types of defects, such as, e.g., a shrinking CD, narrowing of a gate structure, or collapse of the material, etc.), as compared to its corresponding reference structure in the template reference image 603 (marked in dashed square). The set of template images further includes a template difference image 605 representative of the difference between the images 601 and 603.

As shown in the template difference image 605, except for the difference between the defective line structure and its corresponding reference structure which indicates the actual defective feature, there are also shown some residual patterns and noises, which may be caused by process variations etc.

As shown, the set of template patches are prepared as follows: cropping a target template patch 602 from the template inspection image 601, containing the DOI and a surrounding area, cropping a reference template patch 604 at a corresponding location from the template reference image 603, and similarly cropping a difference template patch 606 from the template difference image 605, representative of the difference between the patches 602 and 604.

In addition to the template patches, a set of runtime images of a semiconductor specimen to be examined are acquired in runtime, comprising an inspection image 608, a reference image 610 corresponding to the inspection image, and a difference image 612 representative of the difference therebetween. The goal in the present example is to look for defects in the inspection image 608 that are similar to the target DOI, as illustrated in the template inspection image 601.

Template matching can be performed between the set of template patches 602, 604 and 606, and the set of runtime images 608, 610 and 612. The present example illustrates that template matching between all three image pairs are selected to be performed, namely, the matching between the defect template patch 602 and the inspection image 608, the matching between the reference template patch 604 and the reference image 610, and the matching between the difference template patch 606 and the difference image 612.

Template matching can be performed in any suitable manner. By way of example, the target template patch 602 can move in the inspection image 608 at a step size (e.g., moving as a sliding box/window in the image area of the inspection image 608). Image correlation (or any other similarity based matching techniques) can be performed at each step (e.g., correlation between the target template patch 602 and the image portion in the inspection image 608 that is presently covered by the template patch).

Upon the template patch 602 traversing the entire image area of the inspection image 608, a matching score map 614 can be generated based on the correlation result of each step. The score map 614 represents the similarity between the template patch 602 with respect to each image portion along the traverse of the image area. By way of example, the matching score map 614 can be represented as a probability map comprising probability scores, each representing a probability of a corresponding pixel in the inspection image 608 being a part of a target DOI. The matching between the reference template patch 604 and the reference image 610, as well as the matching between the difference template patch 606 and the difference image 612, can be performed in a similar manner, respectively resulting a matching score map 616 and a matching score map 618.

The three score maps can be combined (e.g., by any type of combining techniques such as averaging, summation, multiplication, etc.) to generate a composite score map 620. The relatively high scores can be identified in the composite score map 620 (as marked in dashed square), e.g., by comparing with a predefined threshold. The locations of the high scores in the composite score map 620 correspond to the locations in the inspection image that are representative of DOI presence (as marked in dashed square in inspection image 608').

As shown, from the matching score map 614 itself, it is not apparent which pixels have higher probability of being the DOI. This is particularly true in cases where the specimen is scanned at a relatively high speed such as during a throughput scan, resulting in the defective feature being represented in a limited amount of pixels. In some cases, when combining the matching score map 614 with matching score map 616 which results from reference patch matching, and provides useful information regarding clean normal patterns and background structures, the combined score map can show enhanced signal strength of the defective feature and improved detection sensitivity of the DOI.

On the other hand, the matching score map 618 resulting from the difference patch matching shows a clear indication of the defective feature. However, due to the residual patterns and noises in the difference image 612, the score map 618 also contains false alarm signals (marked by a dashed circle) caused by the residual patterns which may affect the detection result. When combining the score map 618 with the two other score maps (or at least one of them), the combined composite score map 620 shows enhanced signal strength of the actual defective feature, while at the same time reducing signal strength of the false alarms, thus possessing a much better detection sensitivity of the DOI. This may be owing to the combination of the three score maps, each possessing respective information regarding: the defective feature within the context of the background features, the clean reference features themselves, as well as the difference therebetween. Consequently, their combination allows for a more holistic characterization of the DOI, which leads to better detection performance in terms of detection confidence and sensitivity. In particular, the combination can improve the similarity metric to be more accurate, which when being used to assess the probability of the candidates being DOIs or non-DOIs, can separate the DOIs and non-DOIs better with respect to using only one specific matching.

Figure 4:
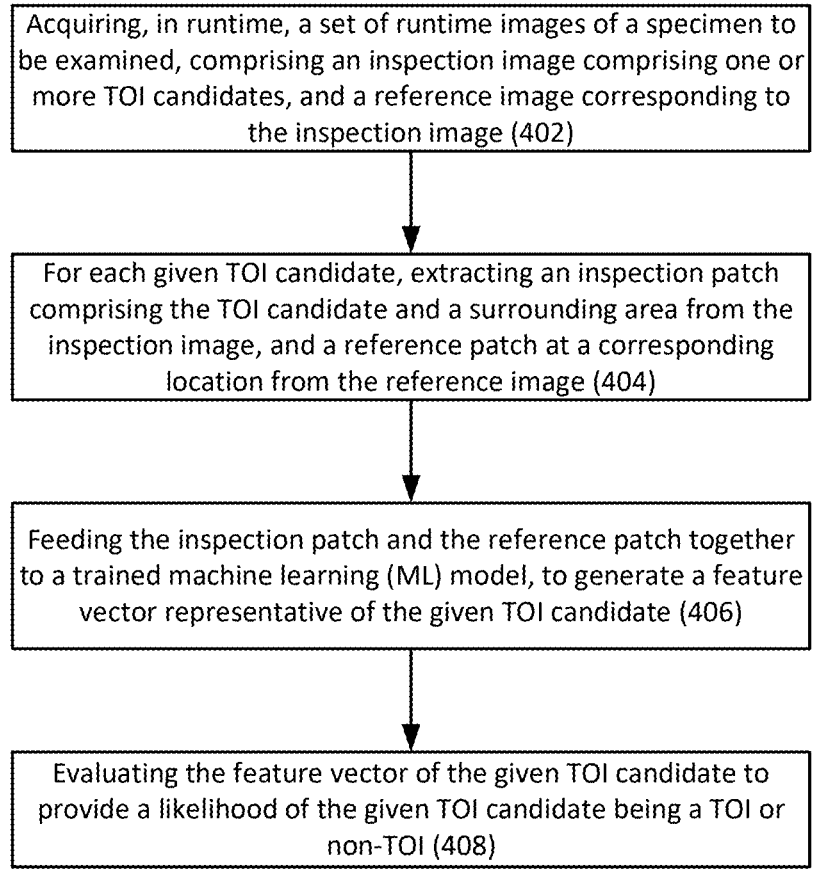
FIG. 4 illustrates a generalized flowchart of runtime defect detection on a semiconductor specimen based on machine learning in accordance with certain embodiments of the presently disclosed subject matter.

According to certain alternative embodiments of the presently disclosed subject matter, in some cases, the runtime defect detection can be performed based on machine learning instead of template matching. FIG. 4 illustrates a generalized flowchart of runtime defect detection on a semiconductor specimen based on machine learning in accordance with certain embodiments of the presently disclosed subject matter.

A set of runtime images of a specimen to be examined can be acquired (402) in runtime (e.g., by the image processing module 104 in processing circuitry 102). The set of runtime images can comprise an inspection image comprising one or more TOI candidates resulting from an inspection process of the semiconductor specimen, and a reference image corresponding to the inspection image. The inspection image and the reference image can be obtained in a similar manner as described above with reference to block 202 in FIG. 2. The inspection process of the specimen can be performed beforehand (e.g., for purpose of defect detection or nuisance filtration), and one or more TOI candidates can be identified based on a detection map (such as, e.g., a defect map or a nuisance map) resulting from the inspection process. In such cases, the goal of the runtime detection can be to verify the likelihood of TOI presence among the one or more candidates.

For each given TOI candidate, an inspection patch comprising the TOI candidate and a surrounding area can be extracted (404) (e.g., by the image processing module 104) from the inspection image. For instance, the inspection patch can be cropped from the inspection image according to a bounding box placed around the TOI candidate. Similarly, a reference patch can be extracted at a corresponding location from the reference image. The inspection and reference patches can be cropped at various sizes, such as, e.g., 32×32 pixels, 64×64 pixels, or any other suitable sizes/dimensions.

The inspection patch and the reference patch can be fed (406) together to a trained machine learning (ML) model (e.g., the ML model 106), to generate a feature vector representative of the given TOI candidate. In particular, the trained ML model generates the feature vector by processing both the inspection patch and the reference patch, such that the generated feature vector is more representative of features of the given TOI candidate itself while being less impacted by different variations, such as patterns and noises in the image patches.

By way of example, the ML model may have an input layer that takes the two image patches (e.g., the inspection patch and the reference patch in the form of two grayscale images) as two separate channels, which will pass through the model simultaneously. Taking CNN as an exemplified implementation of the ML model, during the forward pass, convolutional operations are performed independently on each channel, e.g., each filter in a convolutional layer of the network can be applied independently to each channel and learn to capture spatial features from both channels. The output layer of the ML model can produce feature vectors based on the information extracted from both input channels.

For instance, for each specific layer in the CNN, output feature maps can be generated, e.g., by convolving each filter of the specific layer across the width and height of the input feature maps from each channel, and producing a two-dimensional activation map which gives the responses of that filter at every spatial position for the channel. Stacking the activation maps for all filters along the depth dimension forms the full output feature maps of the specific layer for each channel, which can be represented as a high-dimensional output feature map, with multiple channels, each corresponding to an activation map for a given filter. The high-dimensional output feature map for the two channels can be combined within the network to generate a combined output feature map. The feature vector learnt by the ML model can be represented in the form of combined output feature maps of the output layer, or any of the intermediate layers.

Upon training, the model learns how to map the information from the two image patches together to a combined feature vector. Thus, for each given TOI candidate, the ML model can generate one feature vector based on the two inputs of inspection patch and reference patch.

In some embodiments, optionally, the set of runtime images can further comprise a difference image representative of a difference between the inspection image and the reference image. The difference image can be obtained in a similar manner as described above. In such cases, with respect to block 404, for each given TOI candidate, a difference patch can be extracted at a corresponding location from the difference image, in addition to the inspection patch and the reference patch. In block 406, the inspection patch, the reference patch and the difference patch are fed together to the trained ML model, to generate a feature vector representative of the given TOI candidate. In such cases, the feature vector generated as such takes into consideration the information extracted from all three image patches, including the defective feature within the context of the background features, the clean reference features themselves, as well as the difference features therebetween, thus are expected to be more sufficiently representative of the TOI candidate, while less impacted by irrelevant features such as the background patterns, noises, and variations, etc.

The ML model is previously trained, during a training phase, to map targets of interest (TOIs) and non-TOIs to corresponding feature vectors to an attribute space, such that feature vectors of the TOIs are relatively close to each other with respect to feature vectors of non-TOIs. In other words, the distance of a feature vector from other feature vectors in the attribute space indicates a likelihood of a corresponding TOI candidate being a target of interest (TOI) or a non-TOI. In some cases, the ML model can be trained based on contrastive learning, as will be described in further detail with reference to FIG. 5.

The feature vector of the given TOI candidate can be evaluated (408) (e.g., by the defect examination module 108) to provide a likelihood of the given TOI candidate being a TOI or non-TOI.

In some embodiments, the feature vector of the given TOI candidate can be evaluated by comparing it with a set of feature vectors representative of TOIs (also referred to as TOI feature vectors) and a set of feature vectors representative of non-TOIs (also referred to as non-TOI feature vectors), and providing the likelihood of the given TOI candidate being a TOI or non-TOI based on the similarity therebetween. The set of TOI feature vectors and the set of non-TOI feature vectors can be previously generated by using the trained ML model to process a set of template patches of TOIs and a set of template patches of non-TOIs (such as the two subsets of template patches in the training set), and storing the generated feature vectors in a database (e.g., a feature vector database (DB) in the storage unit 122), as will be described in further detail below with respect to FIG. 5.

In some embodiments, alternatively, the feature vector of the given TOI candidate can be evaluated using a classification model operatively connected to the ML model. The classification model can be configured to classify the given TOI candidate as TOI or non-TOI, based on the feature vector thereof. For instance, the classification model can provide a probability score indicating the likelihood of the given TOI candidate being a TOI or a non-TOI. The classification model can be implemented in any suitable type of classifier architecture, such as, e.g., a k-nearest neighbors (KNN) classifier.

Figure 5:
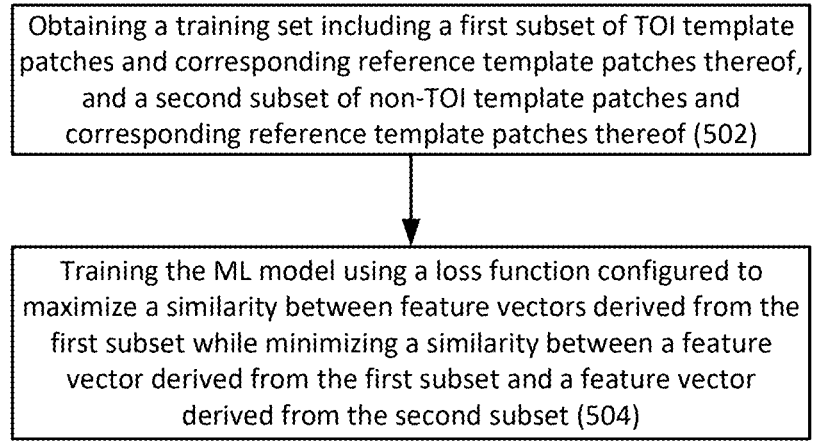
FIG. 5 shows a generalized flowchart of training a ML model usable for feature vector generation in accordance with certain embodiments of the presently disclosed subject matter.

Turning now to FIG. 5, there is illustrated a generalized flowchart of training the ML model usable for feature vector generation in accordance with certain embodiments of the presently disclosed subject matter.

A training set can be obtained (502) (e.g., by a training module in processing circuitry 102). The training set comprises a first subset of training samples, each comprising a TOI template patch (e.g., a template patch comprising a TOI) and a corresponding reference template patch thereof, and a second subset of training samples each comprising a non-TOI template patch (e.g., a template patch without any TOI) and a corresponding reference template patch thereof.

As aforementioned, the TOI in some cases can be a DOI, while in some other cases can be a NOI, which can be predefined, e.g., by the customer. In cases where the TOI is a DOI of a given type, the training set can comprise a first subset of training samples, each comprising a DOI template patch containing at least one DOI of the given type and a reference template patch corresponding to the DOI template patches (e.g., the reference template patch can be a clean template patch which is free of DOIs and usable as a reference for inspection of the DOI template patch), and a second subset of training samples, each comprising a template patch containing at least one nuisance feature and a reference template patch corresponding to the nuisance template patch (e.g., the reference template patch can be a clean template patch, free of any DOI or nuisances, and usable as a reference for inspection of the nuisance template patch).

In cases where the TOI is a NOI of a given type, the training set can comprise a first subset of training samples, each comprising a NOI template patch containing at least one NOI of the given type and a reference template patch corresponding to the NOI template patch (e.g., the reference template patch can be a clean template patch free of any DOI or NOIs and usable as a reference for inspection of the NOI template patch), and a second subset of training samples, each comprising a template patch containing at least one DOI or one nuisance of other types (rather than the given type of NOI) and a reference template patch corresponding to the template patch (e.g., the reference template patch can be a clean template patch free of any DOIs or nuisances and usable as a reference for inspection of the second template patch).

In some embodiments, the ML model can be trained based on contrastive learning. Contrastive learning refers to a ML paradigm that aims to train models by maximizing the similarity between similar instances, and minimizing the similarity between dissimilar instances. The goal is normally to learn a representation of the training data in such a way that similar data points are brought closer together in the learned representation space, while dissimilar points are pushed apart.

In the present disclosure, similar data points refer to positive pairs of image patches that are considered similar or equivalent, such as two TOI template patches from the first subset, or two template patches from the second subset, while dissimilar data points refer to negative pairs of image patches that are considered dissimilar, such as one TOI template patch from the first subset, and one template patch from the second subset. As the ML model is trained on a training set comprising a large amount of data, it learns to map similar instances to nearby points in the representation space (e.g., an embedding space), and dissimilar instances to more distant points. In other words, the ML model learns low-dimensional data representations to contrast between similar and dissimilar instances instead of learning to recognize each instance one by one.

Various loss functions can be used for such training. For example, a contrastive loss can guide similar instances to be mapped to the same or nearby points in the representation space, and dissimilar instances to be mapped to different points whose distances are larger than a threshold.

Specifically, in the present disclosure, the ML model can be trained (504) (e.g., by the training module in processing circuitry 102) using a loss function (such as a contrastive loss) configured to maximize a similarity between feature vectors derived from the first subset, while minimizing a similarity between a feature vector derived from the first subset and a feature vector derived from the second subset. By way of example, assume DOI1 and DOI2 are two template patches from the first subset, while NOI1 is a template patch from the second subset. The feature vector of DOI1 and DOI2 in the representation space are respectively f(DOI1) and f(DOI2), and the feature vector of NOI1 is f(NOI1). The loss function aims to minimize the distance d(f(DOI1), f(DOI2)), while maximizing the distances of d(f(DOI1), f(NOI1)) and d(f(DOI2), f(NOI1)), where d can be any metric function such as a distance-based metric e.g., Euclidean distance. In some cases, a triplet loss can be used, which requires the distance between the similar instances to be smaller than the distance between the dissimilar instances.

In some embodiments, during each training iteration, a batch of positive and negative pairs is used. Each positive pair comprises two training samples from the first subset, where each training sample comprises a DOI template patch and a corresponding reference patch. Each negative pair comprises a training sample from the first subset comprising a DOI template patch and a corresponding reference patch, and a training sample from the second subset comprises a NOI template patch and a corresponding reference patch. Each time a training sample can be fed into the ML model, where two image patches are processed together to generate a feature vector representative of a given TOI candidate, in a similar manner as described above with respect to the runtime processing in block 404 of FIG. 4. In some cases, the ML model can be implemented as a Siamese network, where two identical subnetworks share the same set of parameters. In such cases each subnetwork can process one training sample of the pair simultaneously.

The ML model is then trained to minimize the contrastive loss, adjusting its parameters to improve the agreement of positive pairs, and the disagreement of negative pairs. The ML model, once trained, can be used for TOI detection in runtime examination of semiconductor specimens.

Figure 7:
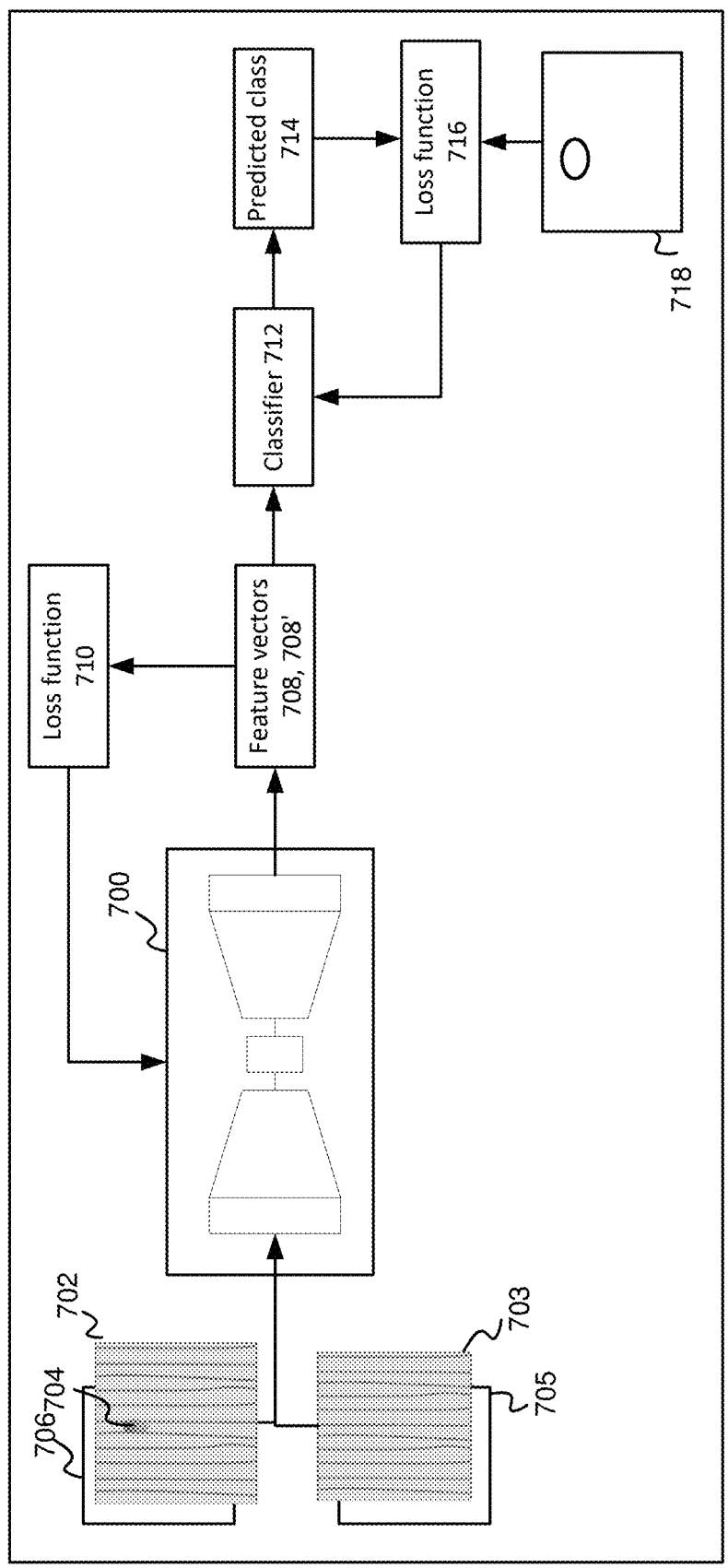
FIG. 7 shows a schematic illustration of a training process of the ML model in accordance with certain embodiments of the presently disclosed subject matter.

FIG. 7 shows a schematic illustration of a training process of the ML model in accordance with certain embodiments of the presently disclosed subject matter.

An ML model 700 is exemplified in FIG. 7. The ML model 700 can be implemented in various types and architectures, such as CNN, attention-based models such as Vision Image Transformer (also referred to as vision transformer or ViT), etc. For training the ML model, a training set is obtained, comprising a first subset of training samples, each comprising a TOI template patch and a corresponding reference template patch thereof, and a second subset of training samples each comprising a non-TOI template patch and a corresponding reference template patch thereof. An example of a training sample from the first subset (also referred to as first training sample) is illustrated, comprising a DOI template patch 702 containing a DOI 704, and a corresponding reference template patch 706. An example of a training sample from the second subset (also referred to as second training sample) is also illustrated, comprising a nuisance template patch 703 (the nuisance may be considered as a minor variation and is not illustrated in the figure), and a corresponding reference template patch 705. The two training samples are considered as dissimilar samples.

The first training sample including the DOI template patch 702 and its reference template patch 704 can be fed to the ML model 700 to be processed. A feature vector 708 representative of the DOI 704 in the representation space can be generated by the ML model 700 based on the information extracted from both template patches 702 and 704.

Similarly, the second training sample, including the nuisance template patch 703 and its reference template patch 705, can be fed to the ML model 700 to be processed. A feature vector 708', representative of the nuisance in the representation space, can be generated by the ML model 700 based on the information extracted from both template patches 703 and 705.

The two feature vectors 708 and 708' can be evaluated using a loss function 710, such as a contrastive loss as described above, and the parameters of the ML model 700 can be optimized so as to minimize the value of the loss function, e.g., by maximizing the distance between the two feature vectors.

Additionally, two training samples from the first subset (including the first training sample including the DOI template patch 702 and its reference template patch 704, and another training sample from the same subset) can be fed to the ML model 700 to be processed. The two training samples are considered as similar samples. The two feature vectors generated therefor can be evaluated using the loss function 710, and the parameters of the ML model 700 can be optimized so as to minimize the value of the loss function, e.g., by minimizing the distance between the two feature vectors.

As aforementioned, in some cases, a classification model (such as the classifier 712), can be operatively connected to the ML model 700 and configured to classify whether a TOI candidate in a runtime image is a TOI or a non-TOI. In such cases, the classification model and the ML model can together form an ML system. In some cases, the ML system, including both its learning components, can be optimized as a whole, using an overall loss function including the contrastive loss and a classification loss. In some other cases, the classifier 712 can be trained separately from the ML model 700.

By way of example, the classifier 712 can take as input the feature vector 708 representative of the DOI 704, and provide a predicted class 714 (in some cases the predicted class can be associated with the probability of the candidate being the predicted class) based on it. The predicted class 714 can be evaluated with respect to the ground truth class 718 of DOI 704, using a loss function 716 (e.g., a classification loss, such as, e.g., Cross Entropy, or Squared Hinge, etc.). The parameters of the classifier 712 can be optimized to minimize the difference between the predicted class 714 and the ground truth class 718.

In some embodiments, some of the training images in the first subset and/or the second subset can be synthetic images generated by image simulation, in comparison to real images resulting from actual image acquisition by an examination tool. By way of example, the first and/or second subset of training images can in some cases comprise only real images, or only synthetic images, or a combination of both types of images in any possible proportion. For instance, the first subset can comprise at least one template patch synthetically generated by implanting a DOI in a clean image patch. Similarly, the second subset can comprise one or more real images and/or synthetic nuisance template patches. The present disclosure is not limited to the type or number of training images and/or the specific ways of acquiring/generating them.

Once the ML model 700 and the classifier 712 are trained, they can be deployed in production for runtime TOI detection, such as defect detection, and/or nuisance filtration, etc.

The output as generated by the ML system, such as the estimated TOI presence, can be used for further defect examination (e.g., by the defect examination module 108). Such defect examination can refer to one or more of the following operations: defect detection, defect review, and defect classification.

It is to be noted that examples illustrated in the present disclosure, such as, e.g., the exemplified images and defects, the exemplified ML model, classifier and ML system, the loss functions, the defect examination applications, etc., are illustrated for exemplary purposes, and should not be regarded as limiting the present disclosure in any way. Other appropriate examples/implementations can be used in addition to, or in lieu of the above.

Among advantages of certain embodiments of the presently disclosed subject matter as described herein, is providing an automatic detection system capable of detecting TOI presence (either DOI or NOI) in runtime images based on either template matching or machine learning.

The template-matching based detection system prepares a set of template patches in advance, and performs a selective matching between the set of template patches and the set of runtime images, where at least two template matchings are selected to be performed, instead of only matching between the defect template patch and the inspection image. Such template matching can leverage the information from inspection, reference and/or difference images, which, when being combined, can provide enhanced TOI signals while suppressing false alarms and various variations.

Among further advantages of certain embodiments of the presently disclosed subject matter as described herein, is that in cases where the inspection image comprise one or more TOI candidates resulting from an inspection process of the semiconductor specimen, the matching of DOIs and the matching of NOIs can be both performed, such that the candidates having higher probabilities of being DOIs are selected to be further examined (e.g., reviewed and/or classified), and the ones that are likely to be NOIs are filtered out, which can improve detection sensitivity while reducing false alarm rates.

Among further advantages of certain embodiments of the presently disclosed subject matter as described herein, is that in the ML based approach, at least two of the inspection patch, the reference patch and the difference patch, are fed together to the trained ML model, to generate a feature vector representative of the given TOI candidate. In such cases, the feature vector, generated as such, takes into consideration the information extracted from the two or three image patches, including the defective feature within the context of the background features, the clean reference features themselves, as well as the difference features therebetween, thus can be expected to be more sufficiently representative of the TOI candidate, while less impacted by irrelevant features such as the background patterns, noises, and variations, etc.

The above proposed approaches, when being used for TOI detection, can both reduce false alarms caused by variations and noises, and significantly improves detection sensitivity.

It is to be understood that the present disclosure is not limited in its application to the details set forth in the description contained herein or illustrated in the drawings.

In the present detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the present discussions, it is appreciated that throughout the specification discussions utilizing terms such as "obtaining", "examining", "providing", "training", "using", "generating", "performing", "matching", "selecting", "acquiring", "comparing", "combining", "identifying", "evaluating", "augmenting", "extracting", "feeding", "classifying", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the examination system, the TOI detection system (e.g., defect detection system), and respective parts thereof disclosed in the present application.

The terms "non-transitory memory" and "non-transitory storage medium" used herein should be expansively construed to cover any volatile or non-volatile computer memory suitable to the presently disclosed subject matter. The terms should be taken to include a single medium or multiple media (e.g., a centralized or distributed database, and/or associated caches and servers) that store the one or more sets of instructions. The terms shall also be taken to include any medium that is capable of storing or encoding a set of instructions for execution by the computer and that cause the computer to perform any one or more of the methodologies of the present disclosure. The terms shall accordingly be taken to include, but not be limited to, a read only memory ("ROM"), random access memory ("RAM"), magnetic disk storage media, optical storage media, flash memory devices, etc.

The term "specimen" used in this specification should be expansively construed to cover any kind of physical objects or substrates including wafers, masks, reticles, and other structures, combinations and/or parts thereof used for manufacturing semiconductor integrated circuits, magnetic heads, flat panel displays, and other semiconductor-fabricated articles. A specimen is also referred to herein as a semiconductor specimen, and can be produced by manufacturing equipment executing corresponding manufacturing processes.

The term "examination" used in this specification should be expansively construed to cover any kind of operations related to defect detection, defect review, and/or defect classification of various types, segmentation, and/or metrology operations during and/or after the specimen fabrication process. Examination is provided by using non-destructive examination tools during or after manufacture of the specimen to be examined. By way of non-limiting example, the examination process can include runtime scanning (in a single or in multiple scans), imaging, sampling, detecting, reviewing, measuring, classifying, and/or other operations provided with regard to the specimen or parts thereof, using the same or different inspection tools. Likewise, examination can be provided prior to manufacture of the specimen to be examined, and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes (SEM), atomic force microscopes (AFM), optical inspection tools, etc.

The term "metrology operation" used in this specification should be expansively construed to cover any metrology operation procedure used to extract metrology information relating to one or more structural elements on a semiconductor specimen. In some embodiments, the metrology operations can include measurement operations, such as, e.g., critical dimension (CD) measurements performed with respect to certain structural elements on the specimen, including but not limiting to the following: dimensions (e.g., line widths, line spacing, contact diameters, size of the element, edge roughness, gray level statistics, etc.), shapes of elements, distances within or between elements, related angles, overlay information associated with elements corresponding to different design levels, etc. Measurement results such as measured images are analyzed, for example, by employing image-processing techniques. Note that, unless specifically stated otherwise, the term "metrology" or derivatives thereof used in this specification, are not limited with respect to measurement technology, measurement resolution, or size of inspection area.

The term "defect" used in this specification should be expansively construed to cover any kind of abnormality or undesirable feature/functionality formed on a specimen. In some cases, a defect may be a defect of interest (DOI) which is a real defect that has certain effects on the functionality of the fabricated device, thus is in the customer's interest to be detected. For instance, any "killer" defects that may cause yield loss can be indicated as a DOI. In some other cases, a defect may be a nuisance (also referred to as "false alarm" defect) which can be disregarded because it has no effect on the functionality of the completed device and does not impact yield.

The term "TOI candidate" used in this specification should be expansively construed to cover a suspected TOI location on the specimen which is detected to have relatively high probability of being a target of interest (TOI). Therefore, a TOI candidate, upon being reviewed/tested, may actually be a TOI (e.g., a DOI or a NOI), or, in some other cases, it may be non TOIs, or random noise that can be caused by different variations (e.g., process variation, color variation, mechanical and electrical variations, etc.) during inspection.

The term "design data" used in the specification should be expansively construed to cover any data indicative of hierarchical physical design (layout) of a specimen. Design data can be provided by a respective designer and/or can be derived from the physical design (e.g., through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

The term "image(s)" or "image data" used in the specification should be expansively construed to cover any original images/frames of the specimen captured by an examination tool during the fabrication process, derivatives of the captured images/frames obtained by various pre-processing stages, and/or computer-generated synthetic images (in some cases based on design data). Depending on the specific way of scanning (e.g., one-dimensional scan such as line scanning, two-dimensional scan in both x and y directions, or dot scanning at specific spots, etc.), image data can be represented in different formats, such as, e.g., as a gray level profile, a two-dimensional image, or discrete pixels, etc. It is to be noted that in some cases the image data referred to herein can include, in addition to images (e.g., captured images, processed images, etc.), numeric data associated with the images (e.g., metadata, hand-crafted attributes, etc.). It is further noted that images or image data can include data related to a processing step/layer of interest, or a plurality of processing steps/layers of a specimen.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the present detailed description, numerous specific details are set forth in order to provide a thorough understanding of the methods and apparatus.

It will also be understood that the system according to the present disclosure may be, at least partly, implemented on a suitably programmed computer. Likewise, the present disclosure contemplates a computer program being readable by a computer for executing the method of the present disclosure. The present disclosure further contemplates a non-transitory computer-readable memory tangibly embodying a program of instructions executable by the computer for executing the method of the present disclosure.

The present disclosure is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the present disclosure as hereinbefore described without departing from its scope, defined in and by the appended claims.

The invention claimed is:

1. A computerized system of defect detection on a semiconductor specimen, the system comprising a processing circuitry configured to:
    obtain a set of template patches comprising: a target template patch capturing a target of interest (TOI), a reference template patch corresponding to the target template patch, and a difference template patch representative of a difference therebetween;
    acquire, during runtime, a set of runtime images of a semiconductor specimen to be examined, comprising an inspection image, a reference image corresponding to the inspection image, and a difference image representative of a difference therebetween;
    perform template matching between the set of template patches and the set of runtime images, comprising selectively performing at least two of: matching the defect template patch in the inspection image, matching the reference template patch in the reference image, or matching the difference template patch in the difference image; and
    provide likelihood of TOI presence in the inspection image based on a result of the template matching.

2. The computerized system according to claim 1, wherein the TOI is a defect of interest (DOI), or a nuisance of interest (NOI).

3. The computerized system according to claim 1, wherein the template matching is performed based on a similarity measure between corresponding template patches and runtime images, giving rise to at least two matching score maps, and wherein the likelihood is provided by combining the at least two matching score maps to a composite score map, and identifying one or more relatively high scores in the composite score map corresponding to one or more locations in the inspection image representative of the TOI presence.

4. The computerized system according to claim 1, wherein the template matching is performed by: matching the defect template patch in the inspection image, and matching the reference template patch in the reference image.

5. The computerized system according to claim 1, wherein the template matching is performed by: matching the defect template patch in the inspection image, matching the reference template patch in the reference image, and matching the difference template patch in the difference image.

6. The computerized system according to claim 1, wherein the inspection image comprises one or more TOI candidates resulting from an inspection process of the semiconductor specimen, and the likelihood is provided with respect to verifying TOI presence among the one or more TOI candidates.

7. The computerized system according to claim 6, wherein the processing circuitry is further configured to obtain a first set of template patches where the target template patch, capturing a DOI, and a second set of template patches where the target template patch, capturing a NOI, perform template matching between the first set of template patches and the set of runtime images to provide likelihood of DOI presence among the one or more TOI candidates, and perform template matching between the second set of template patches and the set of runtime images to provide likelihood of NOI presence among the one or more TOI candidates.

8. The computerized system according to claim 1, wherein the processing circuitry is further configured to augment the set of template patches based on image transformation, giving rise to at least one augmented set of template patches, and include the at least one augmented set in the set of template patches.

9. The computerized system according to claim 1, wherein the set of template patches captures context information surrounding the TOI.

10. The computerized system according to claim 1, wherein the set of template patches is prepared during a setup phase based on previously captured images or synthetic images, or during runtime based on runtime images that were associated with TOI presence.

11. The computerized system according to claim 1, wherein the set of template patches is obtained based on images with relatively higher signal-to-noise ratio (SNR) captured in a sensitive scan, whereas the set of runtime images is acquired in a throughput scan with relatively low SNR.

12. The computerized system according to claim 1, wherein the processing circuitry is further configured to include the likelihood of TOI presence of a given TOI in the inspection image as an attribute in an attribute set characterizing the given TOI, and using the attribute set for one or more defect examination applications.

13. A computerized method of defect detection on a semiconductor specimen, the method comprising:
obtaining a set of template patches comprising: a target template patch capturing a target of interest (TOI), a reference template patch corresponding to the target template patch, and a difference template patch representative of a difference therebetween;
acquiring, during runtime, a set of runtime images of a semiconductor specimen to be examined, comprising an inspection image, a reference image corresponding to the inspection image, and a difference image representative of a difference therebetween;
performing template matching between the set of template patches and the set of runtime images, comprising selectively performing at least two of: matching the defect template patch in the inspection image, matching the reference template patch in the reference image, or matching the difference template patch in the difference image; and
providing likelihood of TOI presence in the inspection image based on a result of the template matching.

14. The computerized method according to claim 13, wherein the template matching is performed based on a similarity measure between corresponding template patches and runtime images, giving rise to at least two matching score maps, and wherein the likelihood is provided by combining the at least two matching score maps to a composite score map, and identifying one or more relatively high scores in the composite score map corresponding to one or more locations in the inspection image representative of the TOI presence.

15. The computerized method according to claim 13, wherein the template matching is performed by: matching the defect template patch in the inspection image, and matching the reference template patch in the reference image.

16. The computerized method according to claim 13, wherein the template matching is performed by: matching the defect template patch in the inspection image, matching the reference template patch in the reference image, and matching the difference template patch in the difference image.

17. The computerized method according to claim 13, wherein the inspection image comprises one or more TOI candidates resulting from an inspection process of the semiconductor specimen, and the likelihood is provided with respect to verifying TOI presence among the one or more TOI candidates.

18. The computerized method according to claim 17, wherein the processing circuitry is configured to obtain a first set of template patches where the target template patch captures a DOI, and a second set of template patches where the target template patch captures a NOI, and perform template matching between the first set of template patches and the set of runtime images to provide likelihood of DOI presence among the one or more TOI candidates, and perform template matching between the second set of template patches and the set of runtime images to provide likelihood of NOI presence among the one or more TOI candidates.

19. The computerized method according to claim 13, wherein the set of template patches is obtained based on images with relatively higher signal-to-noise ratio (SNR)

captured in a sensitive scan, whereas the set of runtime images is acquired in a throughput scan with relatively low SNR.

20. A non-transitory computer readable storage medium tangibly embodying a program of instructions that, when executed by a computer, cause the computer to perform a method of defect detection on a semiconductor specimen, the method comprising:
  obtaining a set of template patches comprising: a target template patch capturing a target of interest (TOI), a reference template patch corresponding to the target template patch, and a difference template patch representative of a difference therebetween;
  acquiring, during runtime, a set of runtime images of a semiconductor specimen to be examined, comprising an inspection image, a reference image corresponding to the inspection image, and a difference image representative of a difference therebetween;
  performing template matching between the set of template patches and the set of runtime images, comprising selectively performing at least two of: matching the defect template patch in the inspection image, matching the reference template patch in the reference image, or matching the difference template patch in the difference image; and
  providing likelihood of TOI presence in the inspection image based on a result of the template matching.

* * * * *